US011057097B1

(12) United States Patent
Changlani et al.

(10) Patent No.: US 11,057,097 B1
(45) Date of Patent: Jul. 6, 2021

(54) SINGLE AND DUAL RADIO MODES OF A NETWORK DEVICE

(71) Applicant: HEWLETT PACKARD ENTERPRISE DEVELOPMENT LP, Houston, TX (US)

(72) Inventors: Nitin Changlani, Milpitas, CA (US); Eldad Perahia, Park City, UT (US); Sachin Ganu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/018,254

(22) Filed: Sep. 11, 2020

(51) Int. Cl.
*H04B 7/0452* (2017.01)
*H04B 7/06* (2006.01)
*H04B 7/0413* (2017.01)
*H04B 1/401* (2015.01)

(52) U.S. Cl.
CPC ............ *H04B 7/0689* (2013.01); *H04B 1/401* (2013.01); *H04B 7/0413* (2013.01); *H04B 7/0452* (2013.01)

(58) Field of Classification Search
CPC ....... H04W 88/06; H04W 28/02; H04W 8/02; H04W 28/00; H04W 48/06; H04W 4/00; H04L 47/2433; H04B 7/0689; H04B 1/401; H04B 7/0413; H04B 7/0452
See application file for complete search history.

(56) References Cited

U.S. PATENT DOCUMENTS

| 2014/0254700 | A1 | 9/2014 | Hinman et al. |
| 2017/0055159 | A1 | 2/2017 | Boppana et al. |
| 2017/0208502 | A1* | 7/2017 | Ho ...................... H04W 28/085 |
| 2020/0154521 | A1 | 5/2020 | Nguyen et al. |

OTHER PUBLICATIONS

Network Equipment (Research Paper), Retrieved Jul. 9, 2020, 169 Pgs.
Stream Pro 802.11ax 8x8 MU-MIMO AP (Research Paper), Retrieved Jul. 9, 2020, 2 Pgs.

* cited by examiner

*Primary Examiner* — Rahel Guarino
(74) *Attorney, Agent, or Firm* — Hewlett Packard Enterprise Patent Department

(57) ABSTRACT

Examples described herein provide single and dual radio modes by a network device. Examples may include configuring a network device to communicate with a plurality of client devices using one of a single radio mode and a dual radio mode. Examples may include, based on a relation between a first amount of traffic received by the network device from a first subset of the client devices and a second amount of traffic received by the network device from a second subset of the client devices, reconfiguring the network device to communicate with the plurality of client devices using the other one of the single radio mode and the dual radio mode. Examples may include communicating, by the network device, with the plurality of client devices using the other one of the single radio mode and the dual radio mode.

19 Claims, 8 Drawing Sheets

SINGLE AND DUAL RADIO MODES OF A NETWORK DEVICE

BACKGROUND

A network device may provide a communication link between nodes of one or more computer networks. For example, a network device may provide a wireless communication link between client devices in a wireless local area network (WLAN). Moreover, in such example, the network device may provide a communication link between the WLAN and the Internet.

A network device may be configured to communicate with a client device using a single-user, multiple-input, multiple-output (DL SU-MIMO) mode. SU-MIMO is a wireless communication technology that allows a network device (e.g., an access point) to communicate with a client device (e.g., transmit data to the client device, receive data from the client device) using simultaneous spatial streams (i.e., data streams) between the network device and the client device. When a network device is configured to use a SU-MIMO mode to communicate with a client device, throughput may be increased as compared to when the network device is configured to communicate with the client device using only a single-user, single-input, single-output (SU-SISO) mode (i.e., using only a single spatial stream).

A network device may also be configured to communicate with multiple client devices using a multi-user, multiple-input, multiple-output (MU-MIMO) mode. MU-MIMO is a wireless communication technology that allows a network device to communicate with multiple client devices using simultaneous spatial streams between the network device and the client devices. In some instances, throughput may be increased when a network device communicates with multiple client devices using a MU-MIMO mode as compared to when the network device communicates with a single client device using a SU-MIMO mode, since throughput in a MU-MIMO mode is based on a combined throughput capacity of multiple client devices rather than of a single client device. Moreover, in some instances, when a network device communicates with one or more client devices using either a MU-MIMO mode or a SU-MIMO mode, signal quality may be improved as compared to when the network device communicates with a client device using a SU-SISO mode, since the multiple spatial streams can be used to improve beamforming of signals and to cancel interference between the network device and the one or more client devices.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
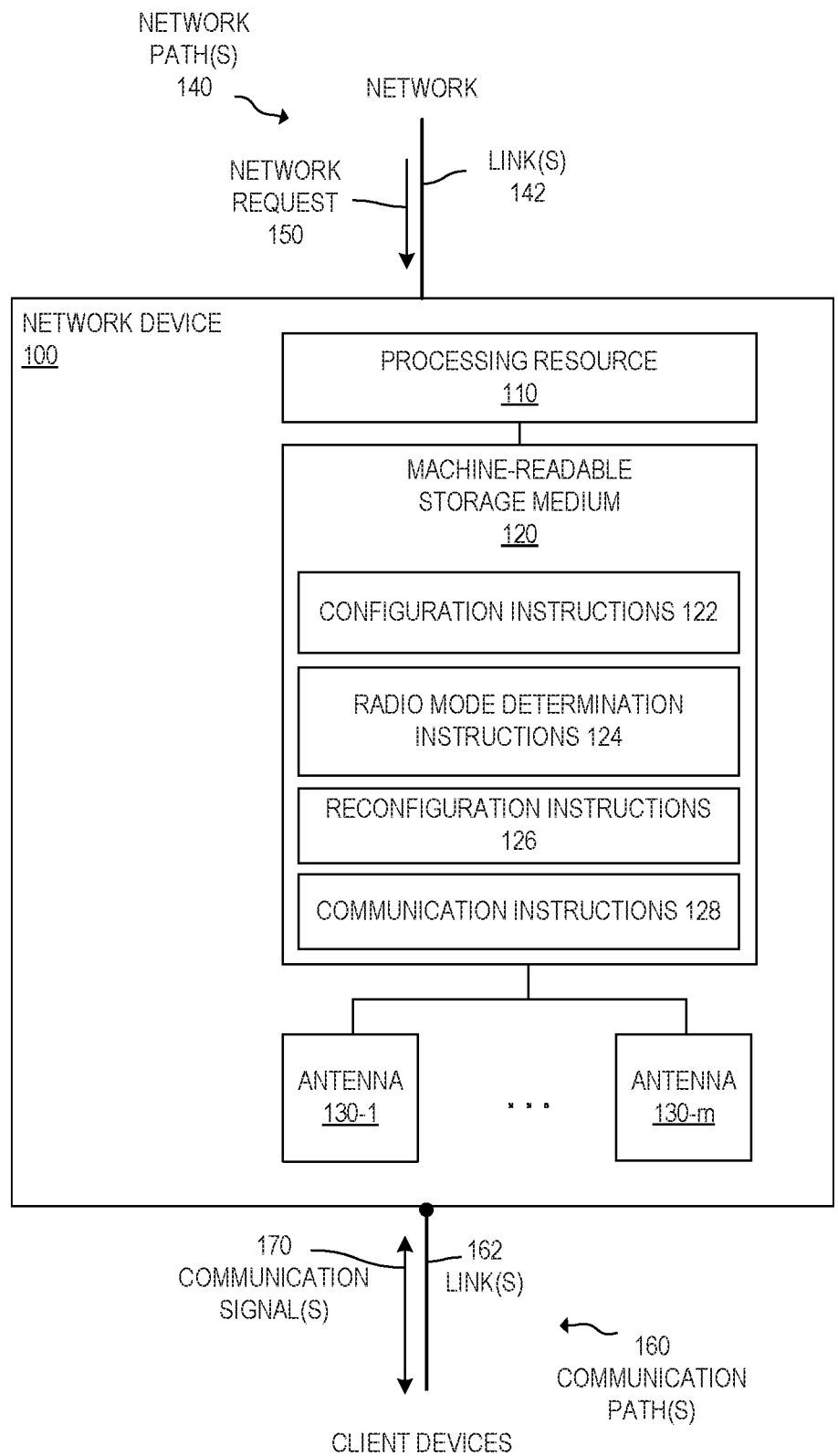
FIG. 1 is a block diagram of an example network device having single and dual radio modes.

Recently, there have been efforts to develop network devices that have a greater number of antennas that can be used to communicate with one or more client devices using simultaneous spatial streams. For instance, the IEEE 802.11ac standard and the proposed IEEE 802.11ax standard support access points (APs) that support up to four simultaneous spatial streams on four antennas (i.e., "4×4 APs") and APs that support up to eight simultaneous spatial streams on eight antennas (i.e., "8×8 APs").

Despite the great potential of network devices that can provide communications using simultaneous spatial streams, existing SU-MIMO and MU-MIMO modes do not adequately account for limitations of client device capabilities. Specifically, existing SU-MIMO and MU-MIMO modes do not account for when a client device is only capable of sending feedback information to a subset of antennas of a network device. For instance, a client device may only be capable of providing feedback on four antennas (i.e., 4-antenna feedback) of an 8×8 AP, rather than on all eight antennas of the 8×8 AP. Because of such limitations of capabilities of one or more client devices, a network device may only use a subset of its antennas to communicate with the one or more client devices. For instance, in the above example, when one or more client devices are only capable of providing 4-antenna feedback, the 8×8 AP may communicate with the one or more client devices using only four antennas, rather than all eight antennas. Accordingly, when using existing SU-MIMO or MU-MIMO modes, a network device may leave one or more of its antennas unused during communication with one or more client devices, thereby limiting the overall performance (e.g., throughput, signal quality) of the network device.

To address these issues, examples described herein provide single and dual radio modes of a network device. Examples described herein may configure a network device to communicate with a plurality of client devices using one of a single radio mode and a dual radio mode. Examples described herein may determine, by the network device, a first subset of the plurality of client devices and a second subset of the plurality of client devices based on capabilities of the plurality of client devices. Examples described herein may receive, by the network device, a first amount of traffic from the first subset of client devices and a second amount of traffic from the second subset of client devices in a predetermined time period, and determine, by the network device, a relation between the first amount of traffic and the second amount of traffic. Examples described herein may, based on the relation between the first amount of traffic and the second amount of traffic, reconfigure the network device to communicate with the plurality of client devices using the other one of the single radio mode and the dual radio mode. Examples described herein may communicate, by the network device, with the plurality of client devices using the other one of the single radio mode and the dual radio mode.

In this manner, examples described herein provide single and dual radio modes by a network device which are based on determined capabilities of client devices in communication with the network device. For instance, in examples described herein, a network device may determine a first subset of the plurality of client devices and a second subset of the plurality of client devices based on capabilities of the plurality of client devices, receive a first amount of traffic from the first subset of client devices and a second amount of traffic from the second subset of client devices in a predetermined time period, and determine a relation between the first amount of traffic and the second amount of traffic, thereby allowing the network device to be reconfigured to use the single radio mode or the dual radio mode based on the determined capabilities of the plurality of client devices and the traffic received by the plurality of client devices. Accordingly, in examples described herein, the network device may be reconfigured to adequately account for limitations of capabilities of client devices, which can improve the overall performance (e.g., throughput, signal quality) of the network device.

Referring now to the drawings, FIG. 1 is a block diagram of an example network device 100 having single and dual radio modes. Network device 100 includes at least one processing resource 110 and at least one machine-readable storage medium 120 comprising (e.g., encoded with) at least configuration instructions 122, radio mode determination instructions 124, reconfiguration instructions 126, and communication instructions 128 that are executable by the at least one processing resource 110 of network device 100 to implement functionalities described herein in relation to configuration instructions 122, radio mode determination instructions 124, reconfiguration instructions 126, and communication instructions 128.

In the example of FIG. 1, network device 100 may engage in any network data transmission operations, including, but not limited to, switching, routing, bridging, or a combination thereof. In some examples, network device 100 may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood that network device 100 may include any suitable type(s) of network device(s) made by any suitable manufacturer(s).

In the example of FIG. 1, network device 100 includes a plurality of antennas 130-1 to 130-*m*, wherein m is an integer and represents a total number of antennas of network device 100. In addition, network device 100 comprises a radio (not shown) comprising the plurality of antennas 130-1 to 130-*m*. The radio may generate a signal in one or more frequency bands, process a signal in one or more frequency bands, or a combination thereof. The radio may operate at any suitable frequency band(s) and conform to any suitable type(s) of wireless communication standards, now known and later developed. For instance, the radio may operate at one or more channels in the 5 GHz band, in accordance with the IEEE 802.11ac and/or 802.11ax standards. Moreover, network device 100 may include one, two, or any other suitable number of additional radios (i.e., in addition to the radio comprising the plurality of antennas 130-1 to 130-*m*).

In the example of FIG. 1, the plurality of antennas 130-1 to 130-*m* may transmit or receive directional signals, omnidirectional signals, or a combination thereof. In examples described herein, a "directional" signal refers to a signal which radiates more strongly in one or more directions as compared to one or more other directions along an azimuth plane (e.g., horizontal plane), whereas an "omnidirectional" signal refers to a signal which radiates equally in all directions along an azimuth plane. In some examples, the plurality of antennas 130-1 to 130-*m* may be part of a phased array. In examples described herein, a "phased array" refers to an array of antennas which can create a directional signal that can be electronically steered to point in different directions. For example, the phased array may comprise the plurality of antennas 130-1 to 130-*m* to focus radio frequency (RF) energy towards one or more specific spatial directions (e.g., angular directions). It will be understood the plurality of antennas 130-1 to 130-*m* may comprise any suitable type(s) of antennas, now known and later developed.

In the example of FIG. 1, network device 100 may be configured (e.g., encoded with instructions executable by at least one processing resource 110) to receive network request(s) 150 via a network path(s) 140 to establish communication with one or more client devices. Network path(s) 140 may include any suitable communication link(s) 142 (e.g., wired or wireless, direct or indirect, etc.) between network device 100 and a network. For example, network device 100 may receive a signal from the network containing network request 150 by the radio that comprises the plurality of antennas 130-1 to 130-*m*. Network request(s) 150 may include any suitable instructions to instruct network device 100 to establish communication with one or more client devices (e.g., to perform configuration instructions 122, radio mode determination instructions 124, reconfiguration instructions 126, and communication instructions 128).

In examples described herein, a "network path" may include a combination of hardware (e.g., communications interfaces, communication links, etc.) and instructions (e.g., executable by a processing resource) to communicate (e.g., receive, send) a command (e.g., network request 150) to an external resource (e.g., server, cloud resource, etc.) connected to the network.

In the example of FIG. 1, network device 100 may be configured (e.g., encoded with instructions executable by at least one processing resource 110) to send or receive communication signal(s) 170 via communication path(s) 160 to establish communication with the one or more client devices. Communication path(s) 160 may include any suitable communication link(s) 162 (e.g., wired or wireless, direct or indirect) between network device 100 and one or more client devices. For example, network device 100 may transmit a communication signal 170 to one or more client devices and/or receive a communication signal 170 from one or more client devices by the radio that comprises the plurality of antennas 130-1 to 130-*m*. Communication signal(s) 170 may include any suitable instructions to instruct network device 100 to establish communication with one or more client devices (e.g., to perform configuration instructions 122, radio mode determination instructions 124, reconfiguration instructions 126, and communication instructions 128).

In examples described herein, a "communication path" may include a combination of hardware (e.g., communications interfaces, communication links, etc.) and instructions (e.g., executable by a processing resource) to communicate (e.g., receive, send) a command (e.g., communication signal 170) with one or more client devices.

Figure 4:
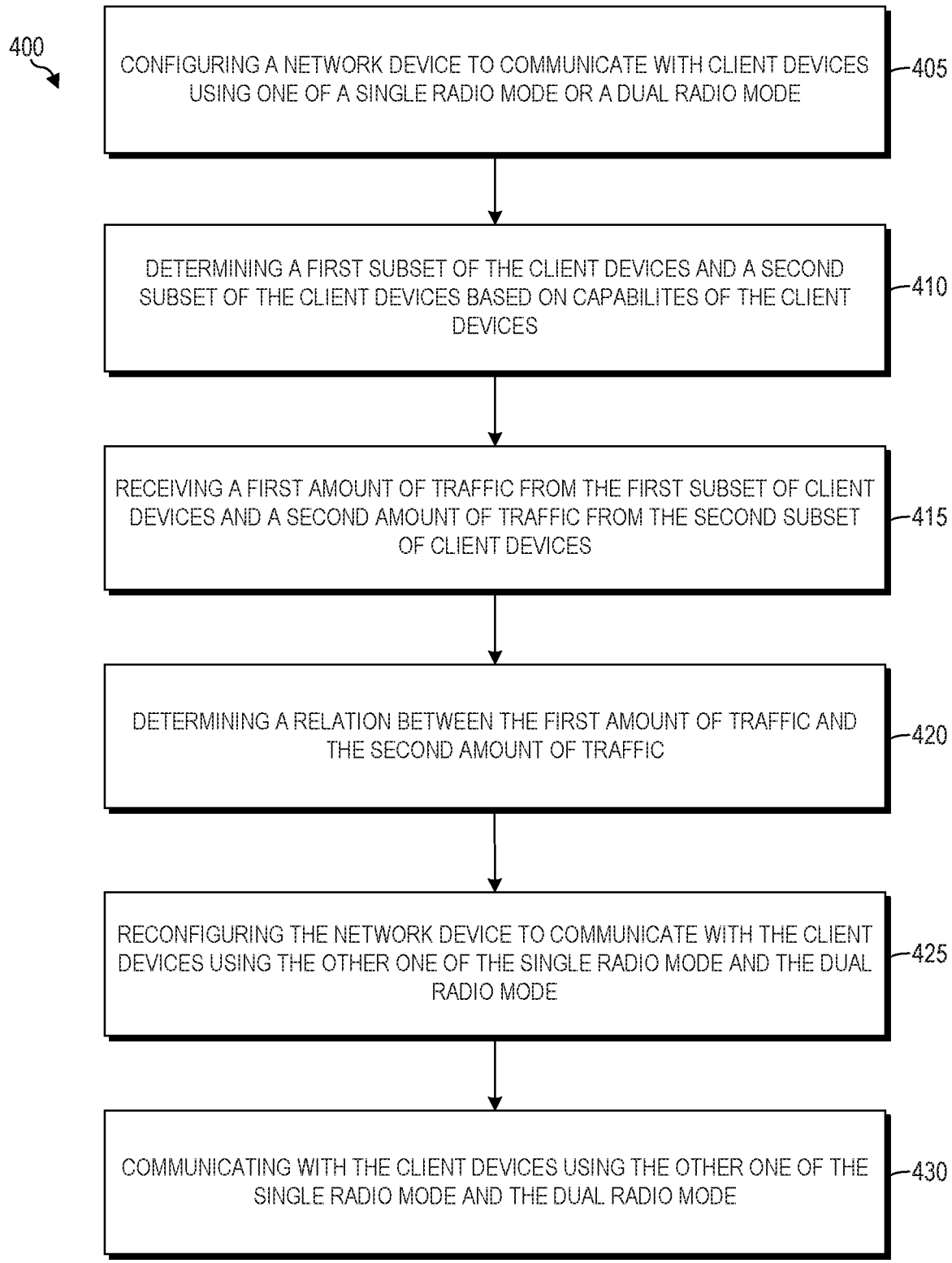
FIG. 4 is a flowchart of an example method for providing single and dual radio modes by a network device.

FIG. 4 is a flowchart of an example method 400 for providing single and dual radio modes by a network device. Although execution of method 400 is described below with reference to network device 100, other network devices suitable for the execution of method 400 may be utilized. Additionally, implementation of method 400 is not limited to such examples. While only six blocks are shown in method 400, method 400 may include other actions described herein. Additionally, although the blocks are shown in an order, blocks depicted in FIG. 4 may be performed in any suitable order and at any time. Also, some of the blocks shown in method 400 may be omitted without departing from the spirit and scope of this disclosure.

Referring to FIG. 4, at block 405 of method 400, configuration instructions 122, when executed by processing resource 110, may configure network device 100 to communicate with a plurality of client devices using one of a single radio mode and a dual radio mode. When network device 100 is configured to use the single radio mode, configuration instructions 122 may comprise instructions to assign a first channel to be used to communicate with the plurality of client devices. Moreover, when network device 100 is configured to use the single radio mode, configuration instructions 122 may comprise instructions to establish a single basic service set (BSS) with the plurality of client devices. The single BSS may be established by the radio comprising the plurality of antennas 130-1 to 130-$m$.

Alternatively, at block 405 of method 400, when network device 100 is configured to use the dual radio mode, configuration instructions 122 may comprise instructions to assign one part of one or more channels to be used to communicate with a first group of the plurality of client devices, and to assign another part of the one or more channels to be used to communicate with a second group of the plurality of client devices. For instance, configuration instructions 122 may comprise instructions to assign a first channel to be used to communicate with the first group of client devices, and to assign a second channel to be used to communicate with the second group of client devices. Alternatively, configuration instructions 122 may comprise instructions to assign one part of a first channel to be used to communicate with the first group of client devices, and to assign another part of the first channel to be used to communicate with the second group of client devices. For instance, one half of the first channel may be assigned to be used to communicate with the first group of client devices, and the other half of the first channel may be assigned to be used to communicate with the second group of client devices. Moreover, when network device 100 is configured to use the dual radio mode, configuration instructions 122 may comprise instructions to establish a first BSS with the first group of client devices, and to establish a second BSS with the second group of client devices. The first BSS and the second BSS may be established by the radio comprising the plurality of antennas 130-1 to 130-$m$.

At block 410 of method 400, radio mode determination instructions 124, when executed by processing resource 110, may determine a first subset of the plurality of client devices and a second subset of the plurality of client devices based on capabilities of the plurality of client devices. In addition, radio mode determination instructions 124 may comprise instructions to determine that the first subset of client devices are each capable of at least one of: (1) a single-user mode that supports up to n simultaneous spatial streams or n-antenna feedback on the plurality of antennas 130-1 to 130-$m$, or (2) a multi-user mode that supports up to n-antenna feedback on the plurality of antennas 130-1 to 130-$m$, wherein n is an integer greater than zero. Moreover, radio mode determination instructions 124 may comprise instructions to determine that the second subset of client devices are each capable of at least one of: (1) a single-user mode that supports greater than n simultaneous spatial streams or greater than n-antenna feedback on the plurality of antennas 130-1 to 130-$m$, or (2) a multi-user mode that supports greater than n-antenna feedback on the plurality of antennas 130-1 to 130-$m$. In some examples, the single-user mode is a SU-MIMO mode and the multi-user mode is a MU-MIMO mode according to IEEE 802.11ac and/or 802.11ax standards, or according to any other suitable wireless communications standard(s). Moreover, the SU-MIMO mode may comprise a downlink SU-MIMO mode, an uplink SU-MIMO mode, or a combination thereof, and the MU-MIMO mode may comprise a downlink MU-MIMO mode, an uplink MU-MIMO mode, or a combination thereof.

At block 410 of method 400, radio mode determination instructions 124 may comprise instructions to transmit, by the radio comprising the plurality of antennas 130-1 to 130-$m$, one or more control frames, wherein the one or more control frames instruct one or more of the plurality of client devices to start measurement of one or more channels being used to communicate with network device 100. In some examples, the one or more control frames may comprise a null data packet (NDP) announcement. In addition, radio mode determination instructions 124 may comprise instructions to transmit one or more data frames to one or more of the plurality of client devices. In some examples, the one or more data frames may comprise an NDP. Furthermore, radio mode determination instructions 124 may comprise instructions to receive, from the plurality of client devices, one or more frames that indicate antenna feedback capabilities of each of the plurality of client devices. In some examples, the one or more frames may indicate channel conditions of one or more channels used to communicate with network device 100. In some examples, the channel conditions may include channel state information (CSI) of the one or more channels used to communicate with network device 100. Moreover, the one or more frames may comprise a channel feedback matrix. The size of the channel feedback matrix may depend on a total number of the plurality of antennas 130-1 to 130-$m$ of network device 100, a total number of antennas of one or more of the client devices, bandwidth(s) of one or more channels used to communicate with network device 100, or a combination thereof. In addition, the channel feedback matrix may be compressed into a steering matrix. Furthermore, the one or more frames may comprise a compressed beamforming frame (CBF) comprising the steering matrix.

In examples described herein, "channel state information" or "CSI" refers to known channel properties of a wireless signal between a transmitter and a receiver. CSI is used to determine how a wireless signal propagates between the transmitter and the receiver and represents the effect, for example, of scattering, fading, or power decay of the transmitted wireless signal with distance, or a combination thereof.

At block 415 of method 400, radio mode determination instructions 124 may comprise instructions to receive, by the plurality of antennas 130-1 to 130-$m$, a first amount of traffic from the first subset of client devices and a second amount of traffic from the second subset of client devices. The traffic from the first subset of client devices and the second subset of client devices may be received in a predetermined time period. The traffic received by the first subset of client devices and the traffic received by the second subset of client devices may comprise any suitable type(s) of data packets. The predetermined time period may be determined based on a user input, based on data stored in the at least one machine-readable storage medium 120, or a combination thereof. The predetermined time period may be 30 seconds, one minute, or any other suitable time period.

At block 420 of method 400, radio mode determination instructions 124 may comprise instructions to determine a relation between the first amount of traffic and the second amount of traffic. In some examples, the relation between the first amount of traffic and the second amount of traffic comprises a ratio between: (1) the second amount of traffic during the predetermined time period, and (2) a sum of the first amount of traffic and the second amount of traffic during the predetermined time period. This ratio can be expressed as a grouping metric shown in Equation 1 below:

$$\text{grouping metric}(t) = \frac{\text{traffic}(\text{clients}_b) \text{ during time } t}{[\text{traffic}(\text{clients}_b) + \text{traffic}(\text{clients}_a)] \text{ during time } t} \qquad \text{Equation 1}$$

In the grouping metric of Equation 1, t represents the predetermined time period, $clients_a$ represents the first subset of client devices, and $clients_b$ represents the second subset of client devices.

At block 420 of method 400, when network device 100 is configured to use the single radio mode (at block 405), radio mode determination instructions 124 may comprise instructions to determine whether a second channel is available that has a same channel width as the first channel used to communicate with the plurality of client devices when using the single radio mode. Based on a determination that the second channel is available, radio mode determination instructions 124, when executed by processing resource 110, may determine whether a relation between a first amount of traffic received by the first subset of client devices ($clients_a$) and a second amount of traffic received by the second subset of the client devices ($clients_b$) satisfies a first threshold. Specifically, the relation between the first amount of traffic and the second amount of traffic satisfies the first threshold when the grouping metric falls below (i.e., is less than) the first threshold. Alternatively, based on a determination that the second channel is unavailable, radio mode determination instructions 124 may comprise instructions to determine whether a relation between a first amount of traffic received by the first subset of client devices and a second amount of traffic received by the second subset of client devices satisfies a second threshold, wherein the second threshold is greater than the first threshold. Specifically, the relation between the first amount of traffic and the second amount of traffic satisfies the second threshold when the grouping metric falls below (i.e., is less than) the second threshold.

Alternatively, at block 420 of method 400, when network device 100 is configured to use the dual radio mode (at block 405), radio mode determination instructions 124 may comprise instructions to determine whether a channel width of a channel used in the dual radio mode (i.e., a dual radio mode channel width) is a same width as the first channel to be used to communicate with the plurality of client devices using the single radio mode. In some examples, the dual radio mode channel width corresponds to the width of one of the first channel and a second channel used by network device 100 when using the dual radio mode. Alternatively, in some examples, the dual radio mode channel width corresponds to the width of a part of the first channel used by network device 100 when using the dual radio mode. Based on a determination that the dual radio mode channel width is the same width as the first channel, radio mode determination instructions 124 may comprise instructions to determine whether a relation between a first amount of traffic received by the first subset of client devices ($clients_a$) and a second amount of traffic received by the second subset of client devices ($clients_b$) satisfies a first threshold. Specifically, the relation between the first amount of traffic and the second amount of traffic satisfies the first threshold when the grouping metric exceeds (i.e., is greater than) the first threshold. Alternatively, based on a determination that the dual radio mode channel width is not the same width as (i.e., is less than the width of) the first channel, radio mode determination instructions 124 may comprise instructions to determine whether a relation between a first amount of traffic received by the first subset of client devices and a second amount of traffic received by the second subset of client devices satisfies a second threshold, wherein the second threshold is greater than the first threshold. Specifically, the relation between the first amount of traffic and the second amount of traffic satisfies the second threshold when the grouping metric exceeds (i.e., is greater than) the second threshold.

In examples described herein, the first threshold and the second threshold may be determined based on throughput capacities of the first subset of client devices ($clients_a$) and the second subset of client devices ($clients_b$), signal to noise ratios (SNRs) of signals between the first subset of client devices and network device 100 and SNRs of signals between the second subset of client devices and network device 100, signal to interference and noise ratios (SINRs) of signals between the first subset of client devices and network device 100 and SINRs of signals between the second subset of client devices and network device 100, client grouping capabilities of the first subset of client device and the second client devices, or a combination thereof. In some examples, the first threshold corresponds to a first ratio of the grouping metric and the second threshold corresponds to a second ratio of the grouping metric, wherein the second ratio is larger than the first ratio. In other words, the second ratio corresponds to a higher ratio of traffic received by network device 100 from the second subset of client devices, as compared to the first ratio.

At block 425 of method 400, based on (e.g., in response to) the relation between the first amount of traffic and the second amount of traffic, reconfiguration instructions 126, when executed by processing resource 110, may reconfigure network device 100 to communicate with the plurality of client devices using the other one of the single radio mode and the dual radio mode.

At block 425 of method 400, when network device 100 is reconfigured to use the single radio mode, reconfiguration instructions 126 may comprise instructions to assign the first channel to be used to communicate with the plurality of client devices. For instance, an entire bandwidth of the first channel may be assigned to be used to communicate with each of the plurality of client devices. Moreover, when network device 100 is reconfigured to use the single radio mode, reconfiguration instructions 126 may comprise instructions to establish a single BSS with the plurality of client devices. The single BSS may be established by the radio comprising the plurality of antennas 130-1 to 130-m. In addition, when network device 100 is reconfigured to communicate with the plurality of client devices using the single BSS, network device 100 may support greater than n simultaneous spatial streams on the plurality of antennas 130-1 to 130-m.

Alternatively, at block 425 of method 400, when network device 100 is reconfigured to use the dual radio mode, based on (e.g., in response to) a determination that the relation between the first amount of traffic and the second amount of traffic satisfies the first threshold, reconfiguration instructions 126 may comprise instructions to assign the first channel to be used to communicate with a first group of the plurality of client devices, and to assign the second channel to be used to communicate with a second group of the plurality of client devices. In such example, a first subset of the plurality of antennas 130-1 to 130-m of the radio may be assigned to be used to communicate with the first group of client devices, and a second subset of the plurality of antennas 130-1 to 130-m of the radio may be assigned to be used to communicate with the second group of client devices.

Moreover, at block 425 of method 400, when network device 100 is reconfigured to use the dual radio mode, based on (e.g., in response to) a determination that the relation between the first amount of traffic and the second amount of traffic satisfies the second threshold, reconfiguration instructions 126 may comprise instructions to assign one part of the first channel to be used to communicate with a first group of the plurality of client devices, and to assign another part of the first channel to be used to communicate with a second group of the plurality of client devices. For instance, one half of the first channel may be assigned to be used to communicate with the first group of client devices, and the other half of the first channel may be assigned to be used to communicate with the second group of client devices. In addition, a first subset of the plurality of antennas 130-1 to 130-m of the radio may be assigned to be used to communicate with the first group of client devices, and a second subset of the plurality of antennas 130-1 to 130-m of the radio may be assigned to be used to communicate with the second group of client devices.

In addition, at block 425 of method 400, when network device 100 is reconfigured to use the dual radio mode, reconfiguration instructions 126 may comprise instructions to establish a first BSS with a first group of the plurality of client devices, and to establish a second BSS with a second group of the plurality of client devices. The first BSS and the second BSS may be established by the radio comprising the plurality of antennas 130-1 to 130-m. In addition, when network device 100 is reconfigured to communicate with the first group of client devices using the first BSS, network device 100 may support up to n simultaneous spatial streams on a first subset of the plurality of antennas 130-1 to 130-m. Moreover, when network device 100 is reconfigured to communicate with the second group of client devices using the second BSS, network device 100 may support one or more additional simultaneous spatial streams on a second subset of the plurality of antennas 130-1 to 130-m, up to a maximum number of simultaneous spatial streams that are supported by network device 100. When network device 100 is reconfigured to use the dual radio mode, network device 100 may support simultaneous communication with the first group of client devices using the first BSS and the second group of client devices using the second BSS.

In addition, at block 425 of method 400, when network device 100 is reconfigured to use the dual radio mode, based on (e.g., in response to) a determination that the relation between the first amount of traffic and the second amount of traffic satisfies the first threshold, reconfiguration instructions 126 may comprise instructions to assign a first channel to be used to communicate with the first group of client devices, and to assign a second channel to be used to communicate with the second group of client devices. In such example, the first subset of the plurality of antennas 130-1 to 130-m of the radio may be assigned to be used to communicate with the first group of client devices, and the second subset of the plurality of antennas 130-1 to 130-m of the radio may be assigned to be used to communicate with the second group of client devices.

Moreover, at block 425 of method 400, when network device 100 is reconfigured to use the dual radio mode, based on a determination that the relation between the first amount of traffic and the second amount of traffic satisfies the second threshold, reconfiguration instructions 126 may comprise instructions to assign one part of the first channel to be used to communicate with the first group of client devices, and to assign another part of the first channel to be used to communicate with the second group of client devices. For instance, one half of the first channel may be assigned to be used to communicate with the first group of client devices, and the other half of the first channel may be assigned to be used to communicate with the second group of client devices. In addition, the first subset of the plurality of antennas 130-1 to 130-m of the radio may be assigned to be used to communicate with the first group of client devices, and a second subset of the plurality of antennas 130-1 to 130-m of the radio may be assigned to be used to communicate with the second group of client devices.

At block 430 of method 400, communication instructions 128, when executed by processing resource 110, may communicate with the plurality of client devices using the other one of the single radio mode and the dual radio mode. At block 430 of method 400, when network device 100 communicates using the single radio mode, network device 100 may transmit one or more signals to one or more of the plurality of client devices, receive one or more signals from one or more of the plurality of client devices, or a combination thereof. Network device 100 may transmit and/or receive one or more signals using the plurality of antennas 130-1 to 130-m of the radio.

Alternatively, at block 430 of method 400, when network device 100 communicates using the dual radio mode, network device 100 may transmit one or more signals to one or more client devices of the first group of client devices, receive one or more signals from one or more client devices of the second group of client devices, or a combination thereof. In such example, network device 100 may transmit and/or receive one or more signals using the first subset of the plurality of antennas 130-1 to 130-m of the radio. In addition, when network device 100 communicates using the dual radio mode, network device may transmit one or more signals to one or more client devices of the second group of client devices, receive one or more signals from one or more client devices of the second group of client devices, or a combination thereof. In such example, network device 100 may transmit and/or receive one or more signals using the second subset of the plurality of antennas 130-1 to 130-m of the radio. When network device 100 communicates using the dual radio mode, network device 100 may simultaneously communicate with the first group of client devices and the second group of client devices.

In this manner, example network device 100 of FIG. 1 (and example method 400 of FIG. 4) may provide single and dual radio modes which are based on determined capabilities of client devices in communication with network device 100. For instance, network device 100 may determine a first subset of the plurality of client devices and a second subset of the plurality of client devices based on capabilities of the plurality of client devices (at block 410), receive a first amount of traffic from the first subset of client devices and a second amount of traffic from the second subset of client devices in a predetermined time period (at block 415), and determine a relation between the first amount of traffic and the second amount of traffic (at block 420), thereby allowing network device 100 to be reconfigured to use the single radio mode or the dual radio mode based on the determined capabilities of the plurality of client devices and the traffic received by the plurality of client devices. Accordingly, network device 100 may be reconfigured (at block 425) to adequately account for the capabilities of client devices, which can improve the overall performance (e.g., throughput, signal quality) when network device 100 communicates with the plurality of client devices (at block 430).

For instance, when network device 100 is an 8×8 AP that comprises a radio having eight antennas 130-1 to 130-8 and that is configured to communicate with a plurality of client devices using a single radio mode (to provide eight simultaneous spatial streams on a single channel using the eight antennas 130-1 to 130-8), network device 100 may reconfigure itself from the single radio mode to a dual radio mode (e.g., to operate as one 4×4 AP that provides four simultaneous spatial streams on one part of one or more channels using four antennas 130-1 to 130-4, and to operate as another 4×4 AP that provides four simultaneous spatial streams on another part of the one or more channels using four antennas 130-5 to 130-8) to communicate with a plurality of client devices. Network device 100 may determine a first subset of the plurality of client devices and a second subset of the plurality of client devices based on capabilities of the plurality of client devices. Specifically, network device 100 may determine that the first subset of client devices are each capable of at least one of: (1) a single-user mode that supports up to four simultaneous spatial streams or 4-antenna feedback on the eight antennas 130-1 to 130-8, or (2) a multi-user mode that supports up to 4-antenna feedback on the eight antennas 130-1 to 130-8. In addition, network device 100 may determine that the second subset of client devices are each capable of at least one of: (1) a single-user mode that supports greater than four simultaneous spatial streams (i.e., five to eight spatial streams) or greater than 4-antenna feedback (i.e., 5-antenna feedback to 8-antenna feedback) on the eight antennas 130-1 to 130-8, or (2) a multi-user mode that supports greater than 4-antenna feedback (i.e., 5-antenna feedback to 8-antenna feedback) on the eight antennas 130-1 to 130-8. Next, network device 100 may determine a relation between the first amount of traffic and the second amount of traffic in a predetermined time period (e.g., 1 minute) according the grouping metric shown in Equation 1 above. When network device 100 determines that the grouping metric falls below a threshold (i.e., either the first threshold or the second threshold), network device 100 may lose its benefit of transmitting eight simultaneous spatial streams using a single channel, and may increase throughput and/or signal quality by transmitting four simultaneous spatial streams on one part of one or more channels and four simultaneous spatial streams on another part of the one or more channels. Thus, network device 100 reconfigures itself to use the dual radio mode and operates as two 4×4 APs instead (e.g., either by providing four simultaneous spatial streams on a first channel and four simultaneous spatial streams on a second channel, or by providing four simultaneous spatial streams on one part of a first channel and providing four simultaneous spatial streams on another part of the first channel). In such example, the client devices can be load balanced to communicate with network device 100 using the two channels via any suitable techniques (e.g., client-steering).

Moreover, in the above example where network device is an 8×8 AP, network device 100 may reconfigure itself from a dual radio mode to a single radio mode to communicate with a plurality of client devices. Network device 100 may determine a first subset of the plurality of client devices and a second subset of the plurality of client devices based on capabilities of the plurality of client devices. Specifically, network device 100 may determine that the first subset of client devices are each capable of at least one of: (1) a single-user mode that supports up to four simultaneous spatial streams or 4-antenna feedback on the eight antennas 130-1 to 130-8, or (2) a multi-user mode that supports up to 4-antenna feedback on the eight antennas 130-1 to 130-8. In addition, network device 100 may determine that the second subset of client devices are each capable of at least one of: (1) a single-user mode that supports greater than four simultaneous spatial streams (i.e., five to eight spatial streams) or greater than 4-antenna feedback (i.e., 5-antenna feedback to 8-antenna feedback) on the eight antennas 130-1 to 130-8, or (2) a multi-user mode that supports greater than 4-antenna feedback (i.e., 5-antenna feedback to 8-antenna feedback) on the eight antennas 130-1 to 130-8. Next, network device 100 may determine a relation between the first amount of traffic and the second amount of traffic in a predetermined time period (e.g., 1 minute) according the grouping metric shown in Equation 1 above. When network device 100 determines that the grouping metric exceeds a threshold (i.e., either the first threshold or the second threshold), network device 100 may experience increased throughput and/or signal quality by transmitting eight simultaneous spatial streams using a single channel, as compared to by transmitting four simultaneous spatial streams on one part of one or more channels and four simultaneous spatial streams on another part of the one or more channels. Thus, network device 100 reconfigures itself in the single radio mode and operates as one 8×8 AP instead (e.g., by providing eight simultaneous spatial streams on a first channel).

Figure 2:
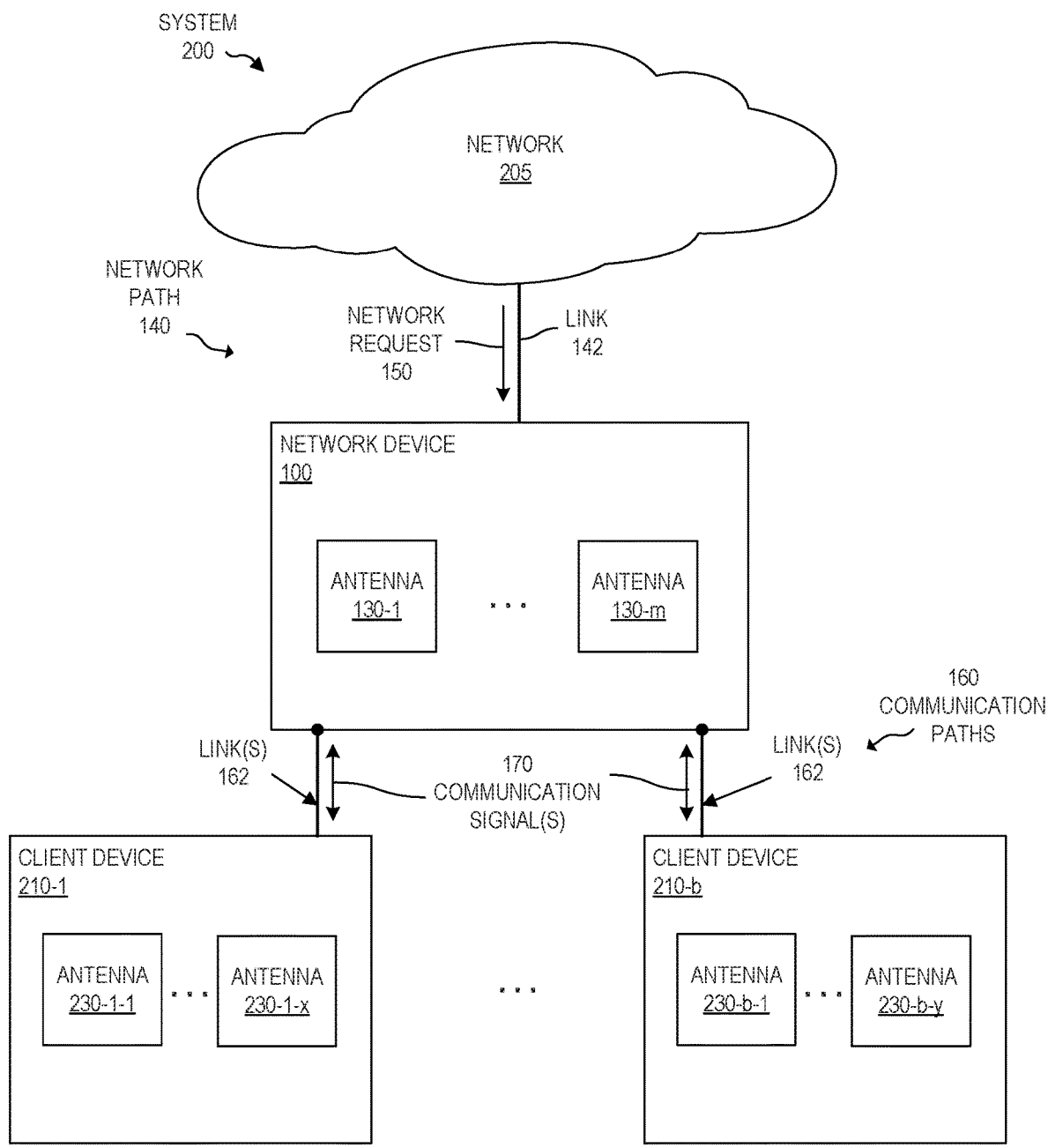
FIG. 2 shows a block diagram for an example system including a network device having single and dual radio modes.

FIG. 2 is a block diagram of an example system 200 including a network device having single and dual radio modes. System 200 includes network device 100 as described above in relation to FIG. 1. In addition, system 200 comprises a network 205 and a plurality of client devices 210-1 to 210-b, wherein b is an integer and represents a total number of client devices in system 200.

In the example of FIG. 2, network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, in some examples, network 205 may comprise one or more cellular networks using one or more mobile communications standards (e.g., 4G, 5G, etc.). It will be understood that system 200 may comprise any suitable type(s) of network(s) 205. Moreover, although FIG. 2 shows that a single network device 100 is connected to network 205, it will be understood that any suitable number(s) of network devices (in addition to network device 100) may be connected to network 205.

In the example of FIG. 2, each of the plurality of client devices 210-1 to 210-b includes at least one antenna. For instance, client device 210-1 may include a plurality of antennas 230-1-1 to 230-1-$x$, wherein x is an integer and represents a total number of antennas of client device 210-1, and client device 210-$b$ may include a plurality of antennas 230-$b$-1 to 230-$b$-$y$, wherein y is an integer and represents a total number of antennas of client device 210-$b$. Moreover, each of the plurality of client devices 210-1 to 210-$b$ comprises at least one radio (not shown) comprising the at least one antenna of the client device. The at least one radio of each of the plurality of client devices 210-1 to 210-$b$ may generate a signal in one or more frequency bands, process a signal in one or more frequency bands, or a combination thereof. The at least one radio of each of the plurality of client devices 210-1 to 210-$b$ may operate at any suitable frequency band(s) and conform to any suitable type(s) of wireless communication standards, now known and later developed. For instance, a radio of client device 210-1 may operate at one or more channels in the 5 GHz band, in accordance with the IEEE 802.11ac and/or 802.11ax standards. Moreover, each of the plurality of client devices 210-1 to 210-$b$ may include one, two, or any other suitable number of additional radios (i.e., in addition to the at least one radio comprising the at least one antenna).

In the example of FIG. 2, each of the at least one antenna of the plurality of client devices 210-1 to 210-$b$ may transmit or receive directional signals, omnidirectional signals, or a combination thereof. In some examples, a plurality of antennas of a client device (e.g., client device 210-1, client device 210-$b$) may be part of a phased array. For example, client device 210-1 may include a phased array comprising the plurality of antennas 230-1-1 to 230-1-$x$ to focus RF energy towards one or more specific spatial directions (e.g., angular directions). It will be understood each of the at least one antenna of the plurality of client devices 210-1 to 210-$b$ may comprise any suitable type(s) of antenna(s), now known and later developed.

In the example of FIG. 2, network device 100 may be configured to receive network request(s) 150 via a network path(s) 140 to establish communication with one or more of the plurality of client devices 210-1 to 210-$b$. For example, network device 100 may receive a signal from network 205 containing network request 150 by the radio that comprises the plurality of antennas 130-1 to 130-$m$. Network request(s) 150 may include any suitable instructions to instruct network device 100 to establish communication with one or more of the plurality of client devices 210-1 to 210-$b$ (e.g., to perform at least configuration instructions 122, radio mode determination instructions 124, reconfiguration instructions 126, and communication instructions 128) in a similar manner as described herein in relation to FIGS. 1, 4, 5, and 6.

In the example of FIG. 2, network device 100 may be configured to send or receive communication signal(s) 170 via communication path(s) 160 to establish communication with the plurality of client devices 210-1 to 210-$b$. Communication path(s) 160 may include any suitable communication link(s) 162 between network device 100 and client devices 210-1 to 210-$b$. For example, network device 100 may transmit a communication signal 170 to one or more of the plurality of client devices 210-1 to 210-$b$ and/or receive a communication signal 170 from one or more of the plurality of client devices 210-1 to 210-$b$ by the radio that comprises the plurality of antennas 130-1 to 130-$m$. Communication signal(s) 170 may include any suitable instructions to instruct network device 100 to establish communication with one or more of the plurality of client devices 210-1 to 210-$b$ (e.g., to perform configuration instructions 122, radio mode determination instructions 124, reconfiguration instructions 126, and communication instructions 128) in a similar manner as described herein in relation to FIGS. 1, 4, 5, and 6.

In the example of FIG. 2, system 200 may provide single and dual radio modes by network device 100 which are based on determined capabilities of the plurality of client devices 210-1 to 210-$b$ in communication with network device 100. For instance, network device 100 may be configured to communicate with the plurality of client devices 210-1 to 210-$b$ using one of a single radio mode and a dual radio mode (e.g., in accordance with block 405 of method 400), determine a first subset of the plurality of client devices 210-1 to 210-$b$ and a second subset of the plurality of client devices 210-1 to 210-$b$ based on capabilities of client devices 210-1 to 210-$b$ (e.g., in accordance with block 410 of method 400), receive a first amount of traffic from the first subset of client devices and a second amount of traffic from the second subset of client devices in a predetermined time period (e.g., in accordance with block 415 of method 400), determine a relation between the first amount of traffic and the second amount of traffic (e.g., in accordance with block 420 of method 400), and be reconfigured to use the other one of the single radio mode or the dual radio mode (e.g., in accordance with block 425 of method 400), thereby allowing network device 100 to be reconfigured to use the single radio mode or the dual radio mode based on the determined capabilities of the plurality of client devices 210-1 to 210-$b$ and the traffic received by the plurality of client devices 210-1 to 210-$b$. Accordingly, network device 100 may be reconfigured to adequately account for the capabilities of the plurality of client devices 210-1 to 210-$b$, which can improve the overall performance (e.g., throughput, signal quality) when network device 100 communicates with the plurality of client devices 210-1 to 210-$b$.

Figure 3A:
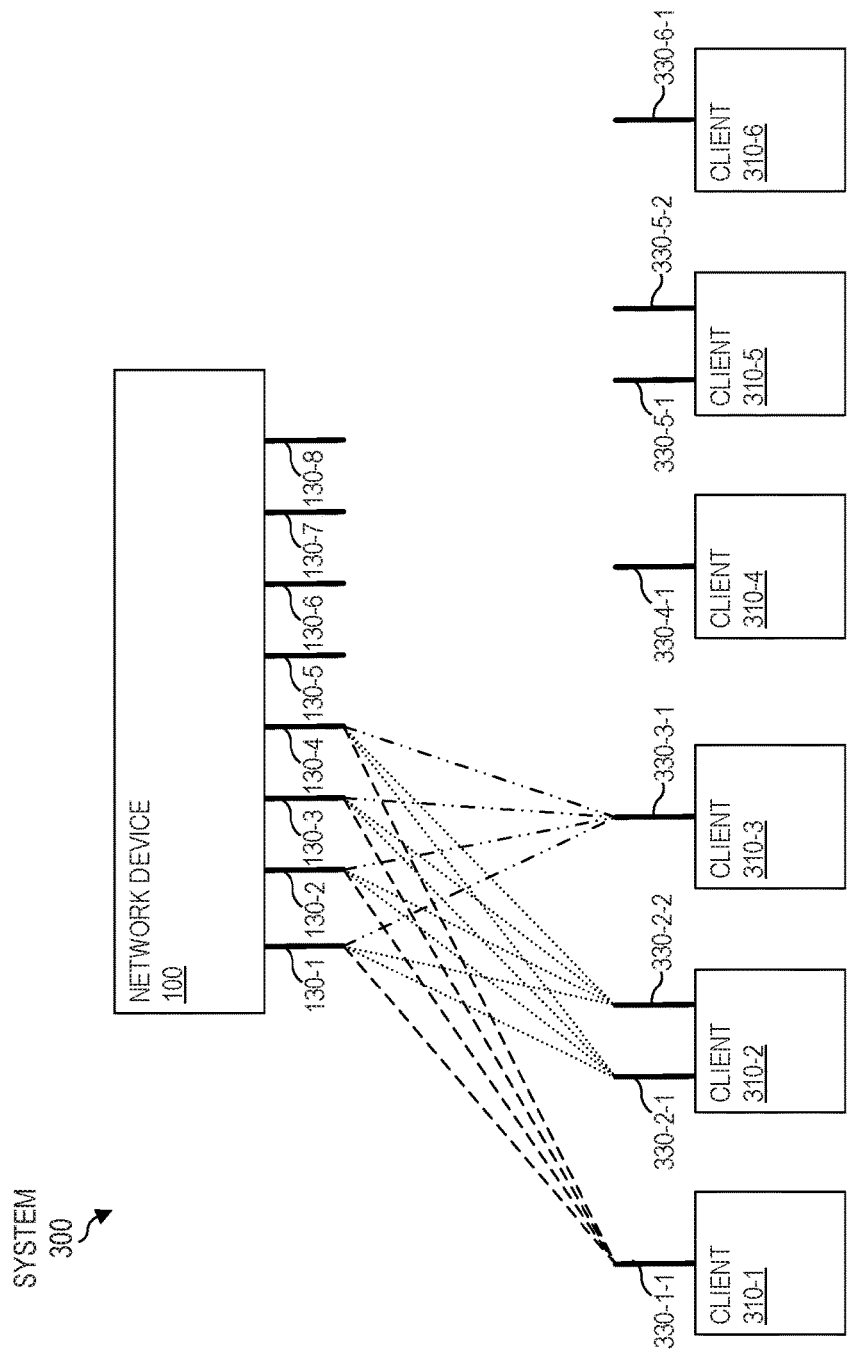
FIGS. 3A and 3B are block diagrams of an example system including a network device having single and dual radio modes.
Figure 3B:
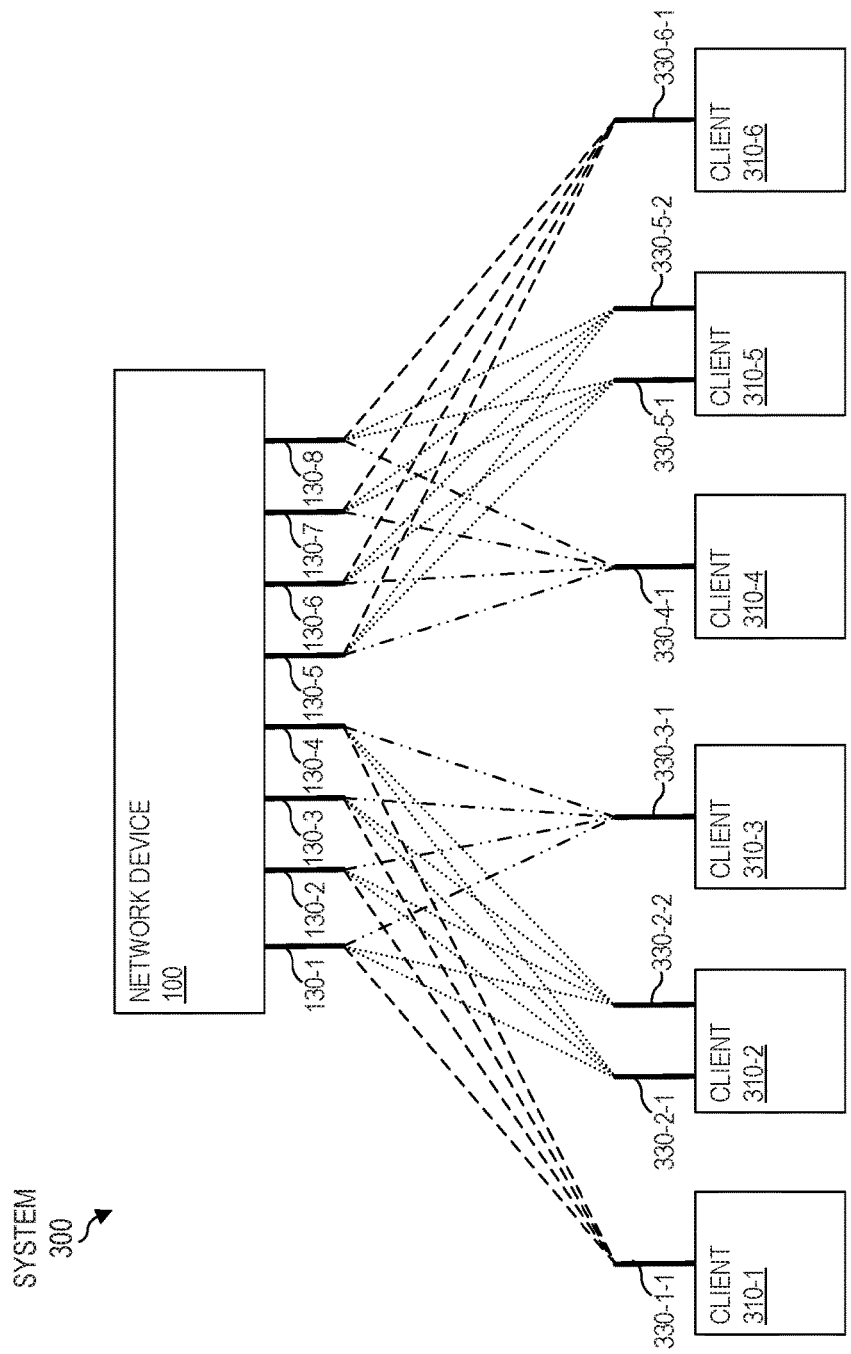

FIGS. 3A and 3B are block diagrams of an example system 300 including a network device having single and dual radio modes. System 300 includes network device 100 as described above in relation to FIGS. 1 and 2. Specifically, as shown in FIGS. 3A and 3B, network device 100 is an 8×8 AP comprising eight antennas 130-1 to 130-8. In addition, system 300 comprises six client devices 310-1 to 310-6. Client devices 310-1 to 310-6 may include similar features as client devices 210-1 to 210-$b$, as described above in relation to FIG. 2. Client device 310-1 comprises one antenna 330-1-1, client device 310-2 comprises two antennas 330-2-1 and 330-2-2, client device 310-3 comprises one antenna 330-3-1, client device 310-4 comprises one antenna 330-4-1, client device 310-5 comprises two antennas 330-5-1 and 330-5-2, and client device 310-6 comprises one antenna 330-6-1. Moreover, each of client devices 330-1 to 330-6 comprises a radio which includes the respective antenna(s) of the client device. Furthermore, each of client devices 330-1 to 330-6 supports a MU-MIMO mode that can provide four simultaneous spatial streams and 4-antenna feedback.

In the example of FIGS. 3A and 3B, network device 100 may establish communication with one or more of the plurality of client devices 310-1 to 310-6 (e.g., by performing at least configuration instructions 122, radio mode determination instructions 124, reconfiguration instructions 126, and communication instructions 128), in a similar manner as described herein in relation to FIGS. 1, 2, 4, 5, and 6.

In the example of FIGS. 3A and 3B, network device 100 may establish simultaneous communication with client devices 310-1, 310-2, and 310-3 by using antennas 130-1, 130-2, 130-3 and 130-4 to transmit four simultaneous spatial streams to client device 310-1, 310-2, and 310-3. Alternatively, network device 100 may establish simultaneous communication with client devices 310-1, 310-2, and 310-3 by using all eight antennas 130-1 to 130-8 to transmit four simultaneous spatial streams to client devices 310-1, 310-2, and 310-3. For instance, as shown in FIG. 3A, network device 100 is configured to use a single radio mode. Specifically, network device 100 establishes a single BSS with clients 310-1 to 310-6 to communicate with clients 310-1 to 310-6 using a first channel. As shown in FIG. 3A, when using the single radio mode, network device 100 may simultaneously transmit one spatial stream to client 310-1, two spatial streams to client 310-2, and one spatial stream to client 310-3. However, as noted above, since each of clients 310-1 to 310-6 is only capable of providing up to 4-antenna feedback, when network device 100 is configured to use the single radio mode, network device 100 may not transmit additional spatial streams to clients 310-1 to 310-6. For instance, when network device 100 transmits a NDP to client devices 310-1 to 310-6 to measure the first channel being used to communicate with client devices 310-1 to 310-6, client devices 310-1, 310-2, and 310-3 may only transmit a channel feedback matrix based on 4-antenna feedback, rather than a channel feedback matrix based on 8-antenna feedback. As a result, network device 100 may only use antennas 130-1 to 130-4 (for which network device 100 received feedback information) to steer a transmit beam (e.g., using beamforming) to client devices 310-1, 310-2, and 310-3. Thus, although network device 100 is an 8×8 AP that is capable of transmitting up to eight simultaneous spatial streams, network device 100 will be limited to using four simultaneous spatial streams when communicating with client devices 310-1 to 310-6 using the single radio mode. Therefore, network device 100 will not fully utilize increased throughput and/or improved signal quality which may be available by using four additional spatial streams, which can diminish the overall performance (e.g., throughput, signal quality) of network device 100. For example, the overall throughput capacity of the 8×8 AP of network device 100 may be diminished by one half when using four simultaneous spatial streams as compared to when using eight simultaneous spatial streams.

As shown in FIG. 3B, network device 100 is reconfigured to use a dual radio mode. Network device 100 may be reconfigured to use the dual radio mode based on a determination that the grouping metric falls below the first threshold. Moreover, network device 100 establishes a first BSS with clients 310-1, 310-2, and 310-3 using the first channel and establishes a second BSS with clients 310-4, 310-5, and 310-6 using a second channel. As shown in FIG. 3B, when using the dual radio mode, network device 100 may simultaneously transmit one spatial stream to client 310-1, two spatial streams to client 310-2, and one spatial stream to client 310-3 using antennas 130-1 to 130-4 and using the first channel, and in addition, simultaneously transmit one spatial stream to client 310-4, two spatial streams to client 310-5, and one spatial stream to client 310-6 using antennas 130-5 to 130-8 and using the second channel. Thus, network device 100 may adequately account for the client feedback capabilities of clients 310-1 to 310-6 when reconfigured to use the dual radio mode. Thus, overall performance (e.g., throughput, signal quality) of network device 100 may be improved during communication with client devices 310-1 to 310-6.

Figure 5:
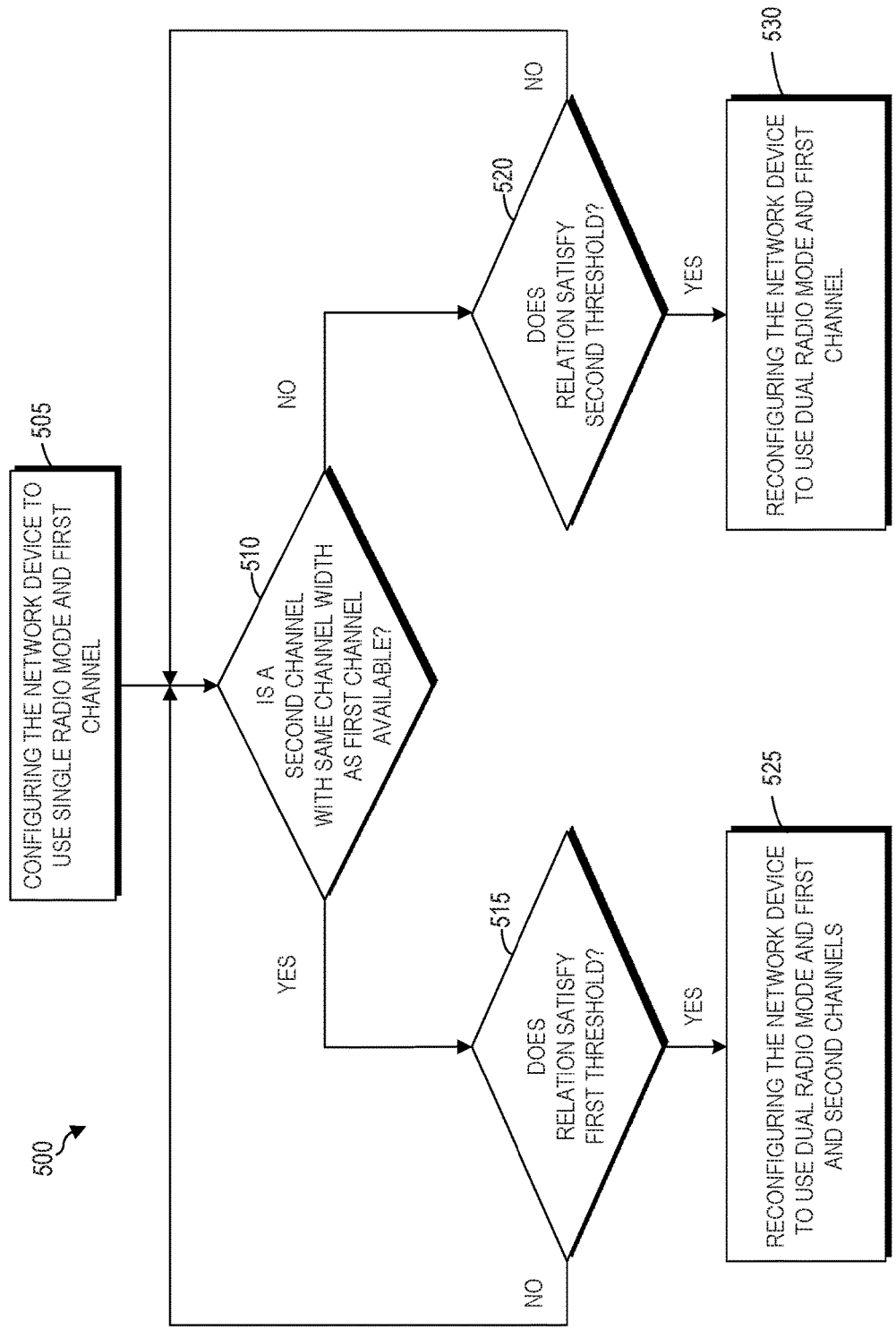
FIG. 5 is a flowchart of an example method for providing single and dual radio modes by a network device.

FIG. 5 is a flowchart of an example method 500 for reconfiguring a network device from a single radio mode to a dual radio mode. Although execution of method 500 is described below with reference to network device 100, other network devices suitable for the execution of method 400 may be utilized. Additionally, implementation of method 500 is not limited to such examples. While only six blocks are shown in method 500, method 500 may include other actions described herein. Additionally, although the blocks are shown in an order, blocks depicted in FIG. 5 may be performed in any suitable order and at any time. Moreover, one or more of blocks of method 500 may be performed in combination with one or more blocks of method 400 and/or method 600. Also, some of the blocks shown in method 500 may be omitted without departing from the spirit and scope of this disclosure.

Referring to FIG. 5, at block 505 of method 500, configuration instructions 122, when executed by processing resource 110, may configure network device 100 to communicate with a plurality of client devices using a single radio mode and a first channel. Specifically, network device 100 may be configured to use an entire bandwidth of the first channel to communicate with each of the plurality of client devices. Moreover, when network device 100 is configured to use the single radio mode, configuration instructions 122 may comprise instructions to establish a single BSS with the plurality of client devices (in accordance with block 405 of method 400).

At block 510 of method 500, radio mode determination instructions 124, when executed by processing resource 110, may determine whether a second channel is available that has a same channel width as the first channel width. At block 510, if it is determined that the second channel is available, then method 500 proceeds to block 515. At block 510, if it is determined that the second channel is unavailable, then method 500 proceeds to block 520.

At block 515 of method 500, radio mode determination instructions 124, when executed by processing resource 110, may determine whether a relation between a first amount of traffic received by a first subset of the plurality of client devices and a second amount of traffic received by a second subset of the client devices satisfies a first threshold. The relation between the first amount of traffic and the second amount of traffic may be determined in accordance with blocks 410 to 425 of method 400. Specifically, the relation between the first amount of traffic and the second amount of traffic satisfies the first threshold when the grouping metric falls below (i.e., is less than) the first threshold. At block 515, if it is determined that the relation satisfies the first threshold, then method 500 proceeds to block 525. At block 515, if it is determined that the relation does not satisfy the first threshold, then method 500 proceeds (returns) to block 510. Method 500 may return to block 510 after a predetermined time period (e.g., 5 seconds, 1 minute, etc.) has elapsed.

At block 525 of method 500, reconfiguration instructions 126, when executed by processing resource 110, may reconfigure network device 100 to use the dual radio mode and to use the first channel and a second channel. At block 525, network device 100 may be configured to use the first channel to communicate with a first group of the plurality of client devices, and to use the second channel to communicate with a second group of the plurality of client devices. Specifically, network device 100 may be configured to use an entire bandwidth of the first channel to communicate with the first group of client devices, and to use an entire bandwidth of the second channel to communicate with the second group of client devices. Moreover, when network device 100 is reconfigured to use the dual radio mode, reconfiguration instructions 126 may comprise instructions to establish a first BSS with the first group of client devices and to establish a second BSS with the second group of client devices (in accordance with block 425 of method 400).

For example, when network device 100 is an 8×8 AP that is configured to use a single radio mode to communicate with a plurality of client devices using a first channel, and a second channel is available that has a same channel width as the first channel, network device 100 may be reconfigured to use the dual radio mode. In such example, network device 100 may be reconfigured to use the dual radio mode based on a determination that the grouping metric falls below the first threshold. Moreover, network device 100 may be reconfigured to operate as one 4×4 AP that uses an entire channel width of the first channel and to operate as another 4×4 AP that uses an entire channel width of the second channel. Although a cumulative physical data rate of network device 100 may be the same as when network device 100 is configured to operate in the single radio mode, when the client devices are only capable of providing 4-antenna feedback, reconfiguring network device 100 to the dual radio mode can effectively double a throughput capacity of network device 100 and improve a signal quality (e.g., SNR) between network device 100 and the client devices.

At block 520 of method 500, radio mode determination instructions 124, when executed by processing resource 110, may determine whether a relation between a first amount of traffic received by a first subset of the plurality of client devices and a second amount of traffic received by a second subset of the client devices satisfies a second threshold, wherein the second threshold is greater than the first threshold. The relation between the first amount of traffic and the second amount of traffic may be determined in accordance with blocks 410 to 425 of method 400. Specifically, the relation between the first amount of traffic and the second amount of traffic satisfies the second threshold when the grouping metric falls below (i.e., is less than) the second threshold. At block 520, if it is determined that the relation satisfies the second threshold, then method 500 proceeds to block 530. At block 520, if it is determined that the relation does not satisfy the second threshold, then method 500 proceeds (returns) to block 510. Method 500 may return to block 510 after a predetermined time period (e.g., 5 seconds, 1 minute, etc.) has elapsed.

At block 530 of method 500, reconfiguration instructions 126, when executed by processing resource 110, may reconfigure network device 100 to use the dual radio mode and to use the first channel. Network device 100 may be configured to use one part of the first channel to communicate with a first group of the plurality of client devices, and to use another part of the first channel to communicate with a second group of the plurality of client devices. Specifically, network device 100 may be configured to use one half of the first channel to communicate with the first group of client devices, and to use the other half of the first channel to communicate with the second group of client devices. Moreover, when network device 100 is configured to use the dual radio mode, reconfiguration instructions 126 may comprise instructions to establish a first BSS with the first group of client devices and to establish a second BSS with the second group of client devices (in accordance with block 425 of method 400).

For example, when network device 100 is an 8×8 AP that is configured to use a single radio mode and to communicate with a plurality of client devices using a first channel, and a second channel having a same channel width as the first channel is unavailable, network device 100 may be reconfigured to use the dual radio mode. In such example, network device 100 may be reconfigured to use the dual radio mode based on a determination that the grouping metric falls below the second threshold. Moreover, network device 100 may be reconfigured to operate as one 4×4 AP that uses one half of a channel width of the first channel and to operate as another 4×4 AP that uses the other half of the channel width of the second channel. Although a cumulative physical data rate of network device 100 may be the same as when network device 100 is configured to operate in the single radio mode, by dividing a bandwidth of the first channel and the second channel across multiple spatial streams on two 4×4 APs, latency of communications with the client devices can be reduced as compared to when network device 100 operates in the single radio mode to communicate with the client devices. Thus, a throughput of network device 100 and a signal quality between network device 100 and the client devices can be improved by reconfiguring network device 100 to operate in the dual radio mode.

In this manner, example network device 100 of FIG. 1 (and example method 500 of FIG. 5) may reconfigure network device 100 from a single radio mode to a dual radio mode based on the determined capabilities of client devices in communication with network device 100. Such reconfiguration of network device 100 from the single radio mode to the dual radio mode can improve the overall performance (e.g., throughput, signal quality) when network device 100 communicates with the plurality of client devices (e.g., at block 430 of method 400).

Figure 6:
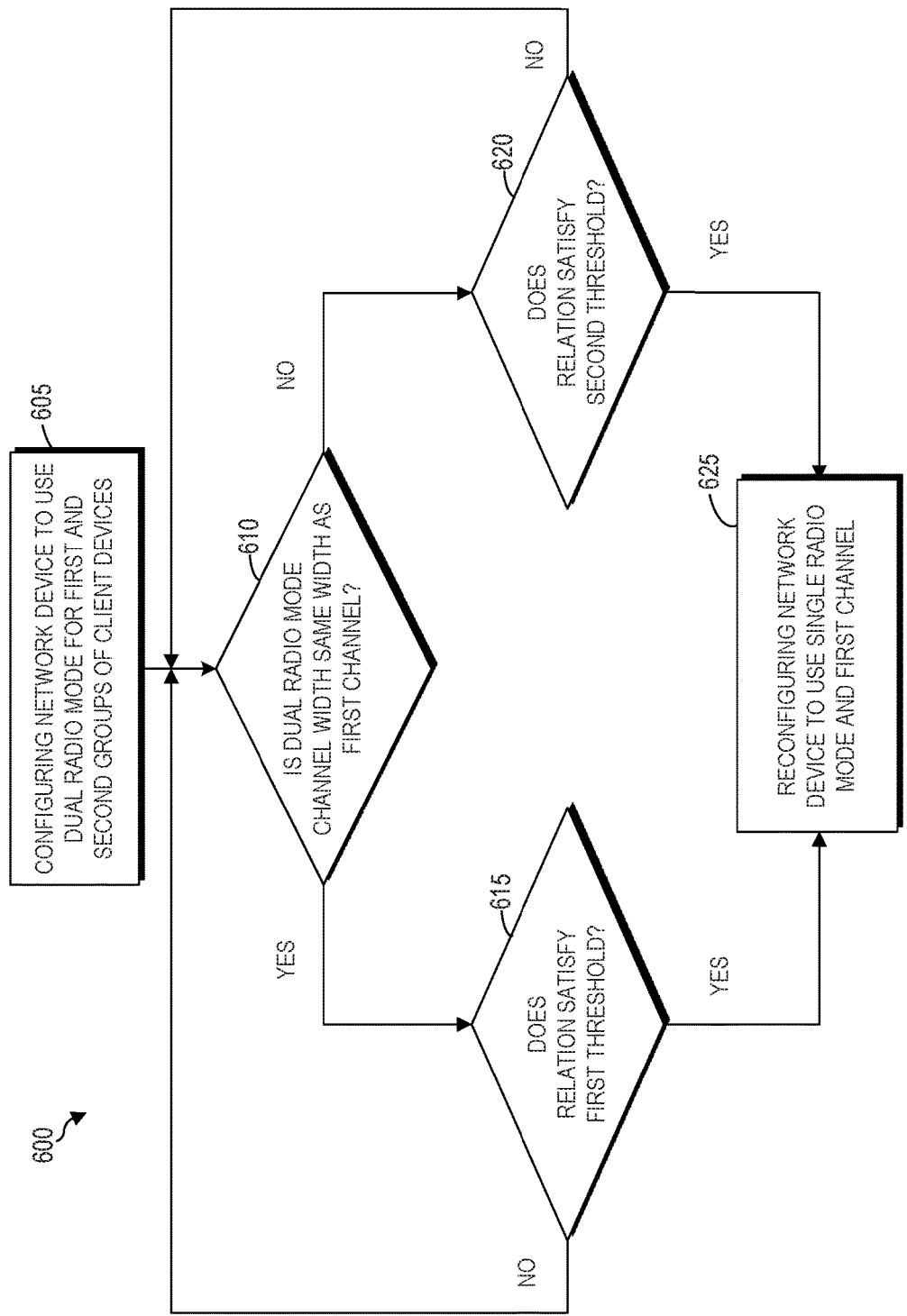
FIG. 6 is a flowchart of an example method for providing single and dual radio modes by a network device.

FIG. 6 is a flowchart of an example method 600 for reconfiguring a network device from a dual radio mode to a single radio mode. Although execution of method 600 is described below with reference to network device 100, other network devices suitable for the execution of method 600 may be utilized. Additionally, implementation of method 600 is not limited to such examples. While only five blocks are shown in method 600, method 600 may include other actions described herein. Additionally, although the blocks are shown in an order, blocks depicted in FIG. 6 may be performed in any suitable order and at any time. Moreover, one or more of blocks of method 600 may be performed in combination with one or more blocks of method 400 and/or method 500. Also, some of the blocks shown in method 600 may be omitted without departing from the spirit and scope of this disclosure.

Referring to FIG. 6, at block 605 of method 600, configuration instructions 122, when executed by processing resource 110, may configure network device 100 to communicate with a plurality of client devices using a dual radio mode for a first group of the plurality of client devices and a second group of the plurality of client devices. For instance, at block 605, network device 100 may be configured to use a first channel to communicate with the first group of client devices and to use a second channel to communicate with the second group of client devices. In such example, the first channel may have the same channel width as the second channel. Moreover, the first channel and the second channel may be determined in accordance with block 525 of method 500. Alternatively, at block 605, network device 100 may be configured to use one part of the first channel to communicate with the first group of client devices and to use another part of the first channel to communicate with the second group of client devices. In such example, the one part of the first channel may be one half of the first channel, and the other part of the first channel may be the other half of the first channel. Moreover, the one part and the other part of the first channel may be determined in accordance with block 530 of method 500. In addition, when network device 100 is configured to use the dual radio mode, configuration instructions 122 may comprise instructions to establish a first BSS with the first group of client devices and to establish a second BSS with the second group of client devices (in accordance with block 405 of method 400).

At block 610 of method 600, radio mode determination instructions 124, when executed by processing resource 110, may determine whether a dual radio mode channel width (as determined at block 605) is a same width as a first channel, wherein the first channel is to be used to communicate with the plurality of client devices using the single radio mode. In some examples, the dual radio mode channel width corresponds to the width of one of the first and second channels. Alternatively, in some examples, the dual radio mode channel width corresponds to the width of a part (e.g., the one part or the other part of the first channel, in accordance with block 530 of method 500) of the first channel. At block 610, if it is determined that the dual radio mode channel width is the same width as the first channel, then method 600 proceeds to block 615. At block 610, if it is determined that the dual radio mode channel width is not the same width as the first channel (i.e., if it is determined that the dual radio mode channel width is smaller than the channel width of the first channel), then method 600 proceeds to block 620.

At block 615 of method 600, radio mode determination instructions 124, when executed by processing resource 110, may determine whether a relation between a first amount of traffic received by a first subset of the plurality of client devices and a second amount of traffic received by a second subset of the client devices satisfies a first threshold. The relation between the first amount of traffic and the second amount of traffic may be determined in accordance with blocks 410 to 425 of method 400. Specifically, the relation between the first amount of traffic and the second amount of traffic satisfies the first threshold when the grouping metric exceeds (i.e., is greater than) the first threshold. At block 615, if it is determined that the relation satisfies the first threshold, then method 600 proceeds to block 625. At block 615, if it is determined that the relation does not satisfy the first threshold, then method 600 proceeds (returns) to block 610. Method 600 may return to block 610 after a predetermined time period (e.g., 5 seconds, 1 minute, etc.) has elapsed.

At block 620 of method 600, radio mode determination instructions 124, when executed by processing resource 110, may determine whether a relation between a first amount of traffic received by a first subset of the plurality of client devices and a second amount of traffic received by a second subset of the client devices satisfies a second threshold, wherein the second threshold is greater than the first threshold. The relation between the first amount of traffic and the second amount of traffic may be determined in accordance with blocks 410 to 425 of method 400. Specifically, the relation between the first amount of traffic and the second amount of traffic satisfies the first threshold when the grouping metric exceeds (i.e., is greater than) the second threshold. At block 620, if it is determined that the relation satisfies the first threshold, then method 600 proceeds to block 625. At block 620, if it is determined that the relation does not satisfy the first threshold, then method 600 proceeds (returns) to block 610. Method 600 may return to block 610 after a predetermined time period (e.g., 5 seconds, 1 minute, etc.) has elapsed.

At block 625, reconfiguration instructions 126, when executed by processing resource 110, may reconfigure network device 100 to use the single radio mode and to use the first channel. At block 625, network device 100 may be configured to use the first channel to communicate with the plurality of client devices. For instance, network device 100 may be configured to use an entire bandwidth of the first channel to communicate with each of the plurality of client devices. Moreover, when network device 100 is reconfigured to use the single radio mode, reconfiguration instructions 126 may comprise instructions to establish a single BSS with the plurality of client devices (in accordance with block 425 of method 400).

For example, when network device 100 is an 8×8 AP that is configured to use a dual radio mode to communicate with a plurality of client devices, network device 100 may be reconfigured to use a single radio mode. In such example, when network device 100 determines that a channel width of a channel used in the dual radio mode (i.e., a dual radio mode channel width) is a same width as a first channel to be used to communicate with the plurality of client devices using the single radio mode, network device 100 may be reconfigured to operate in the single radio mode based on a determination that the grouping metric exceeds (i.e., is greater than) the first threshold. Alternatively, in such example, when network device 100 determines that the dual radio mode channel width is not the same width as (i.e., is less than the width of) the first channel, network device 100 may be reconfigured to operate in the single radio mode based on a determination that the grouping metric exceeds (i.e., is greater than) the second threshold. Moreover, network device 100 may operate as a single 8×8 AP that uses an entire channel width of the first channel to communicate with the client devices. Although a cumulative physical data rate of network device 100 may be the same as when network device 100 is configured to operate in the dual radio mode, such reconfiguration of network device 100 to use the single radio mode is advantageous when a higher ratio of traffic transmitted by network device 100 is to client devices that are capable of providing 8-antenna feedback. This is because the 8-antenna feedback improves the beamforming capabilities of network device 100 when network device 100 steers transmit beams to the client devices, thereby enabling the use of additional spatial streams in the same multi-user group. Such improved beamforming can improve the overall performance (e.g., throughput, signal quality) of network device 100.

In this manner, example network device 100 of FIG. 1 (and example method 600 of FIG. 6) may reconfigure network device 100 from a dual radio mode to a single radio mode based on the determined capabilities of client devices in communication with network device 100. Such reconfiguration of network device 100 from the dual radio mode to the single radio mode can improve the overall performance (e.g., throughput, signal quality) when network device 100 communicates with the plurality of client devices (e.g., at block 430 of method 400).

Figure 7:
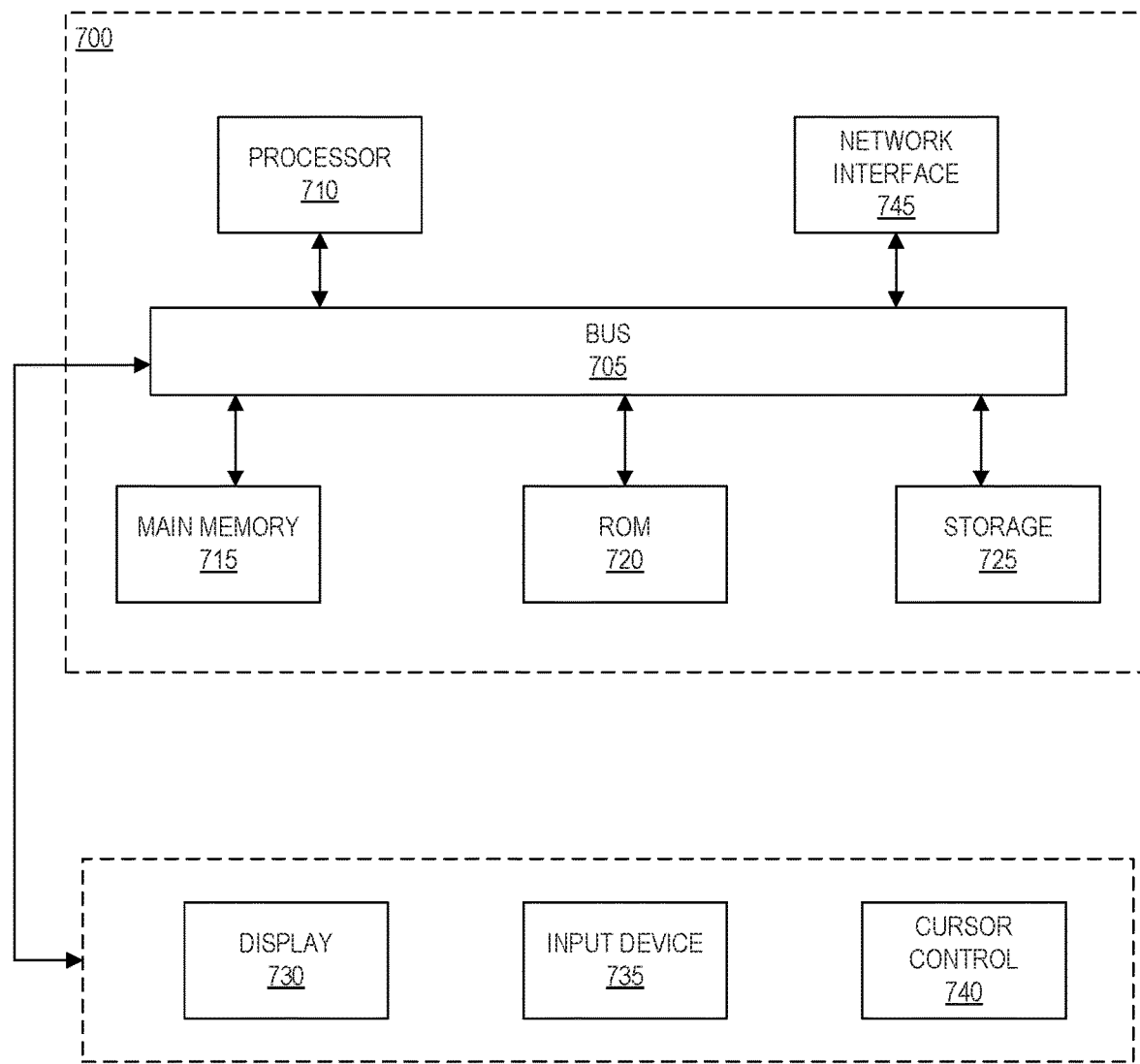
FIG. 7 is a block diagram of an example computer system in which various embodiments described herein may be implemented for providing single and dual radio modes.

FIG. 7 is a block diagram of an example computer system 700 in which various embodiments described herein may be implemented for providing single and dual radio modes.

Computer system 700 includes bus 705 or other communication mechanism for communicating information, at least one hardware processor 710 coupled with bus 705 for processing information. At least one hardware processor 710 may be, for example, at least one general purpose microprocessor.

Computer system 700 also includes main memory 715, such as random access memory (RAM), cache, other dynamic storage devices, or the like, or a combination thereof, coupled to bus 705 for storing information and one or more instructions to be executed by at least one processor 710. Main memory 715 also may be used for storing temporary variables or other intermediate information during execution of one or more instructions to be executed by at least one processor 710. In some examples, the one or more instructions comprise one or more of configuration instructions 122, radio mode determination instructions 124, reconfiguration instructions 126, and communication instructions 128, as described above in relation FIGS. 1-6. Such one or more instructions, when stored on storage media accessible to at least one processor 710, render computer system 700 into a special-purpose machine that is customized to perform the operations specified in the one or more instructions.

Computer system 700 may further include read only memory (ROM) 720 or other static storage device coupled to bus 705 for storing one or more instructions to be executed by at least one processor 710. In some examples, the one or more instructions comprise one or more of configuration instructions 122, radio mode determination instructions 124, reconfiguration instructions 126, and communication instructions 128, as described above in relation to FIGS. 1-6 above. Such one or more instructions, when stored on storage media accessible to at least one processor 710, render computer system 700 into a special-purpose machine that is customized to perform the operations specified in the one or more instructions.

Computer system 700 may further include information and one or more instructions for at least one processor 710. At least one storage device 725, such as a magnetic disk, optical disk, or USB thumb drive (Flash drive), or the like, or a combination thereof, may be provided and coupled to bus 705 for storing information and one or more instructions. In some examples, the one or more instructions comprise one or more of configuration instructions 122, radio mode determination instructions 124, reconfiguration instructions 126, and communication instructions 128, as described above in relation to FIGS. 1-6.

Computer system 700 may further include display 730 coupled to bus 705 for displaying a graphical output to a user. The computer system 700 may further include input device 735, such as a keyboard, camera, microphone, or the like, or a combination thereof, coupled to bus 705 for providing an input from a user. Computer system 700 may further include cursor control 740, such as a mouse, pointer, stylus, or the like, or a combination thereof, coupled to bus 705 for providing an input from a user.

Computer system 700 may further includes at least one network interface 745, such as a network interface controller (NIC), network adapter, or the like, or a combination thereof, coupled to bus 705 for connecting computer system 700 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 based on (e.g., in response to) at least one processor 710 executing one or more sequences of one or more instructions contained in main memory 715. Such one or more instructions may be read into main memory 715 from another storage medium, such as at least one storage device 725. Execution of the sequences of one or more instructions contained in main memory 715 causes at least one processor 710 to perform the process steps described herein. In alternative embodiments, hard-wired circuitry may be used in place of or in combination with software instructions.

In examples described herein, the term "W-Fi" is meant to encompass any type of wireless communications that conforms to any IEEE 802.11 standards, whether 802.11ac, 802.11ax, 802.11a, 802.11n, 802.11ad, 802.11ay, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 60 GHz band for 802.11ad or 802.11ay) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, "throughput" refers to a rate of successful data transmission across a communication link (e.g., a wireless link). Throughput may depend on a bandwidth of the communication link, a maximum rate of data transmission (i.e., peak data rate or peak bit rate) across the communication link, or a combination thereof. Moreover, throughput may depend on an amount of data packet loss during data transmission across the communication link. For example, network device 100 may increase throughput, and thereby improve performance, by increasing bandwidth of a communication link, reducing data packet loss during data transmission across the communication link, or a combination thereof. The throughput of a wireless link may be diminished by degradation of signal quality (e.g., free space path loss) of wireless signals transmitted and/or received to establish the wireless link.

In examples described herein, "beamforming" refers to a signal processing technique for directional signal transmission, directional signal reception, or a combination thereof. In such examples, beamforming may comprise combining two or more signals such that they experience constructive interference, destructive interference, or a combination thereof. In such examples, beamforming may control phase and amplitude of at least one signal transmitted by the radio (using one or more of the plurality of antennas 130-1 to 130-m) of network device 100, to generate constructive interference, destructive interference, or a combination thereof, of the at least one signal. It will be understood that any suitable type(s) of beamforming may be employed, now known or later developed.

In examples described herein, a "signal to noise ratio" or "SNR" of a signal (e.g., communication signal 170) refers to a power (i.e., gain) of the signal divided by a power of background noise. A SNR may have units of ratio of power (e.g., decibels). In examples described herein, a "signal to interference and noise ratio" or "SINR" of a signal (e.g., communication signal 170) refers to a power of the signal divided by a sum of an interference power of one or more interfering signals and a power of background noise. A SINR may have units of ratio of power (e.g., decibels).

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
    configuring a network device to communicate with a plurality of client devices using one of a single radio mode and a dual radio mode;
    determining, by the network device, a first subset of the plurality of client devices and a second subset of the plurality of client devices based on capabilities of the plurality of client devices;
    receiving, by the network device, a first amount of traffic from the first subset of client devices and a second amount of traffic from the second subset of client devices in a predetermined time period;
    determining, by the network device, a relation between the first amount of traffic and the second amount of traffic;
    based on the relation between the first amount of traffic and the second amount of traffic, reconfiguring the network device to communicate with the plurality of client devices using the other one of the single radio mode and the dual radio mode;
    communicating, by the network device, with the plurality of client devices using the other one of the single radio mode and the dual radio mode.

2. The method of claim 1, wherein determining the first subset of client devices and the second subset of client devices comprises:
    determining, by the network device, that each client device in the first subset of client devices is capable of at least one of: (1) a single-user mode that supports up to n simultaneous spatial streams or n-antenna feedback, or (2) a multi-user mode that supports n-antenna feedback, wherein n is an integer greater than zero; and
    determining, by the network device, that each client device in the second subset of client devices is capable of at least one of: (1) a single-user mode that supports greater than n simultaneous spatial streams or greater than n-antenna feedback, or (2) a multi-user mode that supports greater than n-antenna feedback.

3. The method of claim 1, wherein reconfiguring the network device to communicate with the plurality of client devices using the single radio mode comprises:
    establishing, by the network device, a single basic service set (BSS) with the plurality of client devices.

4. The method of claim 1, wherein reconfiguring the network device to communicate with the plurality of client devices using the dual radio mode comprises:
    establishing, by the network device, a first basic service set (BSS) with a first group of the plurality of client devices; and
    establishing, by the network device, a second BSS with a second group of the plurality of client devices.

5. The method of claim 1, comprising:
receiving, by the network device from the plurality of client devices, one or more frames that indicate capabilities of each of the plurality of client devices; and
based on the one or more frames:
determining the first subset of client devices; and
determining the second subset of client devices.

6. The method of claim 1, wherein configuring the network device to communicate with the plurality of client devices using the single radio mode comprises:
assigning, by the network device, a first channel to be used to communicate with the plurality of client devices.

7. The method of claim 6, wherein determining the relation between the first amount of traffic and the second amount of traffic comprises:
determining, by the network device, whether a second channel is available for use that has a same channel width as the first channel;
based on a determination that the second channel is available for use, determining, by the network device, whether the relation between the first amount of traffic and the second amount of traffic satisfies a first threshold; and
based on a determination that the second channel is unavailable for use, determining, by the network device, whether the relation between the first amount of traffic and the second amount of traffic satisfies a second threshold, wherein the second threshold is greater than the first threshold.

8. The method of claim 7, wherein reconfiguring the network device to communicate with the plurality of client devices using the dual radio mode comprises:
based on a determination that the relation between the first amount of traffic and the second amount of traffic satisfies the first threshold:
assigning, by the network device, the first channel to be used to communicate with a first group of the plurality of client devices; and
assigning, by the network device, the second channel to be used to communicate with a second group of the plurality of client devices.

9. The method of claim 7, wherein reconfiguring the network device to communicate with the plurality of client devices using the dual radio mode comprises:
based on a determination that the relation between the first amount of traffic and the second amount of traffic satisfies the second threshold:
assigning, by the network device, one part of the first channel to be used to communicate with a first group of the plurality of client devices; and
assigning, by the network device, another part of the first channel to be used to communicate with a second group of the plurality of client devices.

10. The method of claim 1, wherein configuring the network device to communicate with the plurality of client devices using the dual radio mode comprises:
assigning, by the network device, one part of one or more channels to be used to communicate with a first group of the client devices; and
assigning, by the network device, another part of the one or more channels to be used to communicate with a second group of the client devices.

11. The method of claim 10, wherein determining the relation between the first amount of traffic and the second amount of traffic comprises:
determining, by the network device, whether a channel width of the one part of the one or more channels the same as a first channel width of a first channel, wherein the first channel is to be used to communicate with the plurality of client devices using the single radio mode;
based on a determination that the channel width of the one part of the one or more channels is the same as the first channel width, determining, by the network device, whether the relation between the first amount of traffic and the second amount of traffic satisfies a first threshold; and
based on a determination that the channel width of the one part of the one or more channels is less than the first channel width, determining whether the relation between the first amount of traffic and the second amount of traffic satisfies a second threshold, wherein the second threshold is greater than the first threshold.

12. The method of claim 11, wherein reconfiguring the network device to communicate with the plurality of network devices using the single radio mode comprises:
based on a determination that the relation between the first amount of traffic and the second amount of traffic satisfies the first threshold, assigning, by the network device, the first channel to be used to communicate with the plurality of client devices.

13. The method of claim 11, wherein reconfiguring the network device to communicate with the plurality of network devices using the single radio mode comprises:
based on a determination that the relation between the first amount of traffic and the second amount of traffic satisfies the second threshold, assigning, by the network device, the first channel to be used to communicate with the plurality of client devices.

14. The method of claim 1, wherein the relation between the first amount of traffic and the second amount of traffic comprises a ratio between: (1) the second amount of traffic during the predetermined time period, and (2) a sum of the first amount of traffic and the second amount of traffic during the predetermined time period.

15. A network device, comprising:
a plurality of antennas;
a processing resource; and
a machine-readable storage medium comprising instructions executable by the processing resource to:
configure the network device to communicate with a plurality of client devices using one of a single radio mode and a dual radio mode;
determine a first subset of the plurality of client devices and a second subset of the plurality of client devices based on capabilities of the plurality of client devices;
receive a first amount of traffic from the first subset of client devices and a second amount of traffic from the second subset of client devices in a predetermined time period;
determine a relation between the first amount of traffic and the second amount of traffic;
based on the relation between the first amount of traffic and the second amount of traffic, reconfigure the network device to communicate with the plurality of client devices using the other one of the single radio mode and the dual radio mode; and
communicate with the plurality of client devices using the plurality of antennas and the other one of the single radio mode and the dual radio mode.

16. The network device of claim 15, wherein the instructions to determine the first subset of client devices and the second subset of client devices comprise instructions to:
- determine that each client device in the first subset of client devices is capable of at least one of: (1) a single-user mode that supports up to n simultaneous spatial streams or n-antenna feedback on the plurality of antennas, or (2) a multi-user mode that supports n-antenna feedback on the plurality of antennas, wherein n is an integer greater than zero; and
- determine that each client device in the second subset of client devices is capable of at least one of: (1) a single-user mode that supports greater than n simultaneous spatial streams or greater than n-antenna feedback on the plurality of antennas, or (2) a multi-user mode that supports greater than n-antenna feedback on the plurality of antennas.

17. At least one non-transitory machine-readable storage medium comprising instructions executable by at least one processing resource of a network device to:
- configure the network device to communicate with a plurality of client devices using one of a single radio mode and a dual radio mode;
- determine a first subset of the plurality of client devices and a second subset of the plurality of client devices based on capabilities of the plurality of client devices;
- receive a first amount of traffic from the first subset of client devices and a second amount of traffic from the second subset of client devices in a predetermined time period;
- determine a relation between the first amount of traffic and the second amount of traffic;
- based on the relation between the first amount of traffic and the second amount of traffic, reconfigure the network device to communicate with the plurality of client devices using the other one of the single radio mode and the dual radio mode;
- communicate with the plurality of client devices using the other one of the single radio mode and the dual radio mode.

18. The at least one non-transitory machine-readable storage medium of claim 17, wherein the instructions to determine the first subset of client devices and the second subset of client devices comprise instructions to:
- determine that each client device in the first subset of client devices is capable of at least one of: (1) a single-user mode that supports up to n simultaneous spatial streams or n-antenna feedback, or (2) a multi-user mode that supports n-antenna feedback, wherein n is an integer greater than zero; and
- determine that each client device in the second subset of client devices is capable of at least one of: (1) a single-user mode that supports greater than n simultaneous spatial streams or greater than n-antenna feedback, or (2) a multi-user mode that supports greater than n-antenna feedback.

19. The at least one non-transitory machine-readable storage medium of claim 17, wherein the network device establishes a single basic service set (BSS) with the plurality of client devices when reconfigured to communicate with the plurality of client devices using the single radio mode, or establishes a first basic service set (BSS) with a first group of the plurality of client devices and a second BSS with a second group of the plurality of client devices when reconfigured to communicate with the plurality of client devices using the dual radio mode.

* * * * *